No. 845,597. PATENTED FEB. 26, 1907.
C. A. THOMSON.
MACHINE FOR MOLDING PLASTIC MATERIAL.
APPLICATION FILED MAR. 20, 1905.
2 SHEETS—SHEET 1.
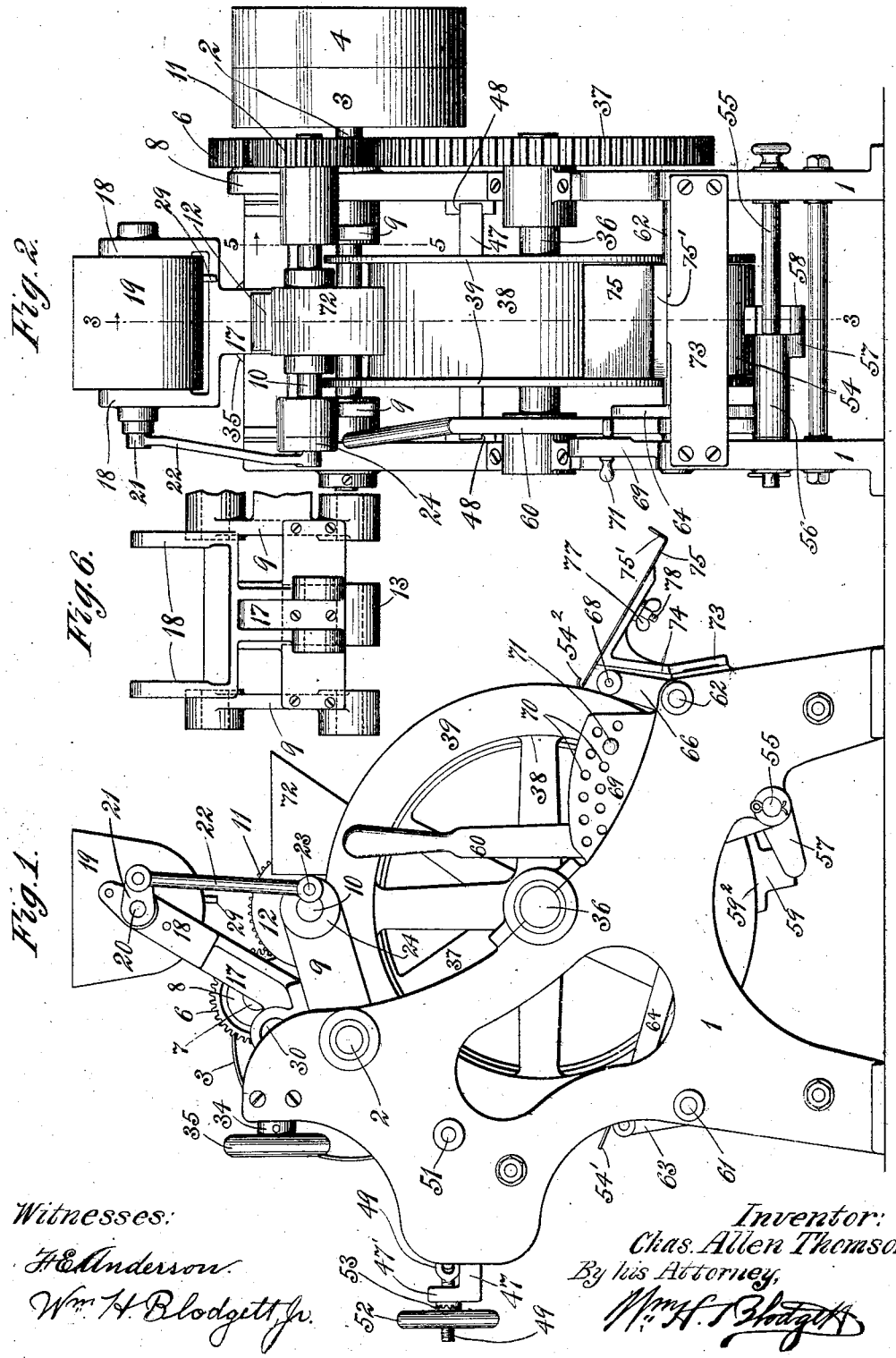
Witnesses:
H. E. Anderson
Wm. H. Blodgett Jr.
Inventor:
Chas. Allen Thomson,
By his Attorney,
Wm. H. Blodgett No. 845,597. PATENTED FEB. 26, 1907.
C. A. THOMSON.
MACHINE FOR MOLDING PLASTIC MATERIAL.
APPLICATION FILED MAR. 20, 1905.
2 SHEETS—SHEET 2.
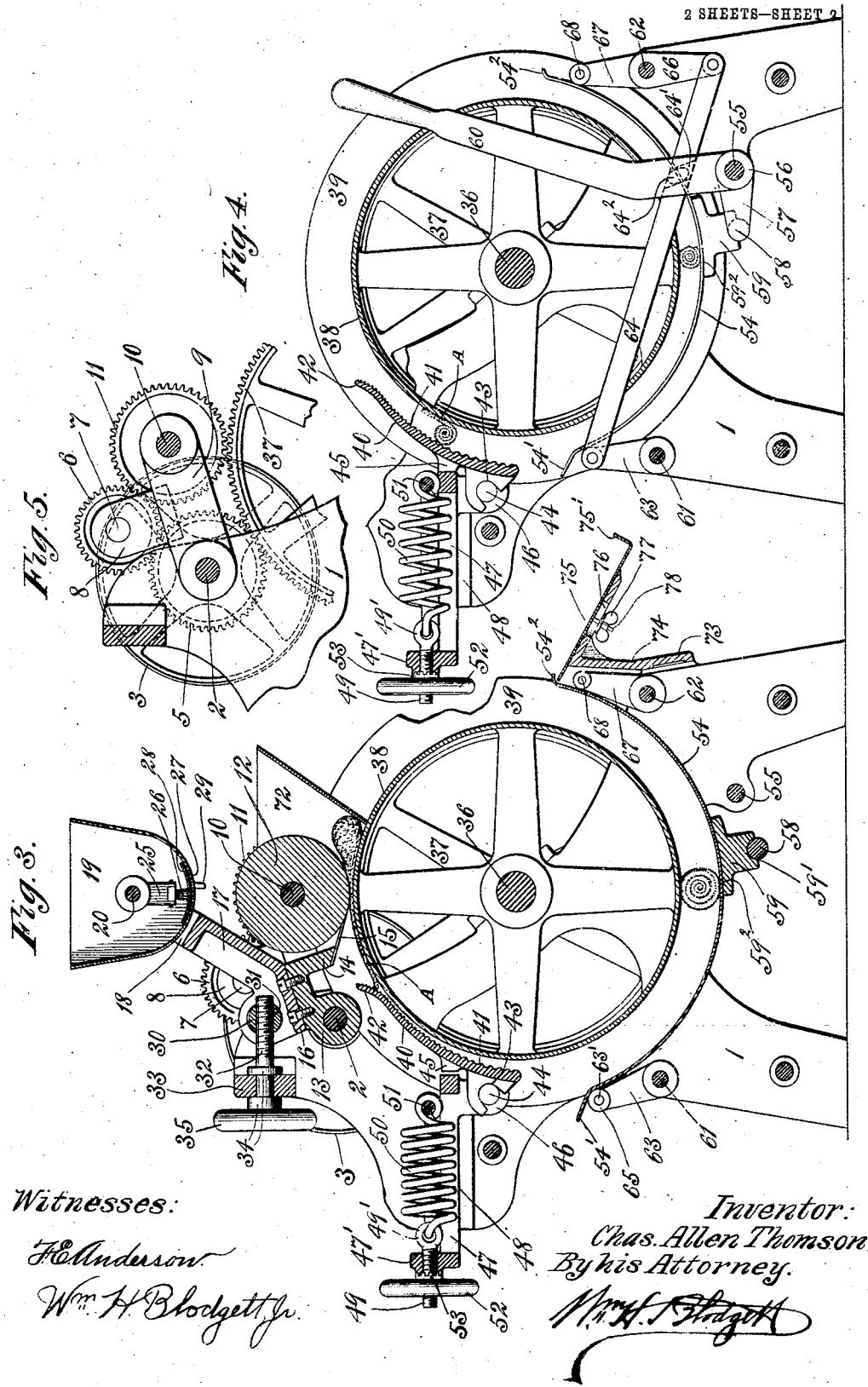
Witnesses:
F. E. Anderson
Wm H. Blodgett Jr.
Inventor:
Chas. Allen Thomson,
By his Attorney.

UNITED STATES PATENT OFFICE.

CHARLES ALLEN THOMSON, OF BELLEVILLE, NEW JERSEY, ASSIGNOR TO C. A. THOMSON MACHINE COMPANY, OF BELLEVILLE, NEW JERSEY, A CORPORATION OF NEW JERSEY.

MACHINE FOR MOLDING PLASTIC MATERIAL.

No. 845,597.     Specification of Letters Patent.     Patented Feb. 26, 1907.

Application filed March 20, 1905. Serial No. 250,942.

*To all whom it may concern:*

Be it known that I, CHARLES ALLEN THOMSON, a citizen of Great Britain, residing at Belleville, in the county of Essex and State of New Jersey, have invented certain new and useful Improvements in Machines for Molding Plastic Material, of which the following is a specification.

This invention relates to apparatus for molding plastic material—for instance, dough—and has for its object the provision of a machine simple in construction and reliable in operation and in which a mass of said material is first reduced to a sheet, the sheet is then formed into a coil or spiral roll, and the coil is finally reduced and formed into a cylinder, ready (in the case of dough) for baking in the oven into a loaf of bread.

A further object of the invention is the provision of an adjustable frame carrying a roller coöperating with a rotary drum, said roller and drum serving to reduce a mass of plastic material into sheet form.

A further object of the invention is the provision of improvements in means for supporting what is known as the "curler" or serrated plate coöperating with the drum to form the sheet into a coiled or spiral form, ready for the subsequent rolling operation by which it is made into a cylinder.

A further object of the invention is the provision of improved means for adjusting the flexible concaved plate between which and the periphery of the drum the coil is rolled into a cylindrical form.

Other objects of the invention will be set forth in the following description.

In the accompanying drawings, Figure 1 is a side elevation of my improved machine for molding plastic material. Fig. 2 is an end elevation of a machine embodying my invention. Fig. 3 is a longitudinal vertical section on line 3 3 of Fig. 2, looking in the direction of the arrow. Fig. 4 is a section similar to Fig. 3 with parts removed, illustrating the action of the curler-plate and drum in forming the sheet into a coil. Fig. 5 is a detail, partially in section, showing the gearing for driving the reducing roll and drum; and Fig. 6 is a detail view of the adjustable frame.

Like numerals designate similar parts throughout the several views.

Referring to the drawings, the numeral 1 designates the framework of the machine, which may be of any desired construction.

Journaled in bearings in extensions of the side plates of said framework is a driving-shaft 2, carrying fast and loose pulleys 3 and 4, driven by the usual shiftable belt. (Not shown.) Other driving means may be substituted for the belt and pulleys, if desired.

Rigid with the shaft 2 is a gear 5, (shown by dotted lines in Fig. 5,) said gear intermeshing with an idler 6, carried by a shaft 7, journaled in a bearing of a short standard 8, rising from one of the arms 9; sleeved at their rear ends upon the driving-shaft 2, about which said arms swing as the center of their arc of movement.

In the free ends of said arms 9 is journaled a shaft 10, carrying a gear 11 in mesh with the idler 6, and rigid with said shaft 10 is a roller 12, coöperating with a drum, hereinafter described, for reducing a mass of plastic material to sheet form.

Sleeved upon the driving-shaft 2 is a carrier 13, having a downward extension 14, to the inclined lower end of which is secured a stripper-plate 15, which prevents the adherence of material to the surface of the roller 12. Secured to or made integral with the carrier 13 is the base 16 of a bifurcated standard 17, between the arms 18 of which is secured a hopper 19 for containing flour to be sprinkled upon the roll 12. Journaled in said arms 18 and passing through the hopper s a shaft 20, carrying at one end a crank 21, connected by a link 22 to a wrist-pin 23 on a circular plate 24, rigid with the outer end of the shaft 10, as shown in Figs. 1 and 2, and to said shaft is secured a carrier 25 for a brush 26. In the concave bottom of the hopper are perforations 27, and above said perforations a perforated plate 28 is provided, which may be slidably adjusted to cause its perforations to register with those of the hopper or to close the same, as circumstances may require, said plate being provided with a manipulating-handle 29, passing through a slot in the hopper, as fully disclosed in the patent granted to me June 3, 1902, No. 701,646, to which reference may be had.

Mounted between the lower ends of the flanges of standards 17 is a short rock-shaft 30, in which a nut 31 is formed, and in engagement with said nut is a screw 32, the shank of which is fitted in a cross-bar 33 of the frame and is prevented from other than rotary movement by collars 34, said screw being provided with a hand-wheel 35, by which it may be turned. As will be evident, the carrier 13, standard 17, and arms 9 constitute a frame swinging upon the shaft 2 as an axis and carrying the gears 5, 6, and 11 and the reducing-roller 12, and by adjusting said frame by means of the screw 32 said roller 12 may either be raised or lowered, to thus control the formation of a sheet of the desired thickness, the rock-shaft 30 oscillating in its loose bearings to prevent binding of the screw and the gearing for driving the reducing-roller being kept in constant mesh. As the shaft 10 rotates the brush or other agitator 25 is rocked back and forth to distribute the flour over the surface containing the perforations, and thus cause the same to be sprinkled over the surface of the roller 12.

Designated by 36 is a shaft journaled in bearings of the frame and carrying at one end a gear-wheel 37 in mesh with the gear 5, by which it is constantly driven while the machine is in operation. Rigid with the shaft 36 and located between the side plates of the frame is a drum 38, having side flanges 39, said drum coöperating with the roller 12 in reducing the mass to a sheet of the desired degree of thickness. This drum may have a peripheral covering of felt or other material, (not shown,) as in my patent aforesaid, if desired.

Referring to Figs. 3 and 4, the numeral 40 designates a curved plate provided with serrations or teeth 41 on its inner side and being slightly curved outwardly at its upper end, as at 42. This plate is provided adjacent to its lower end with a bearing-seat 43, fitting over a stud or shaft 44, and intermediate its ends a stop-lug or projection 45 is formed on the outer surface of the plate. A hanger 46, depending from a slide 47, movable in ways 48 of the frame, supports the stud 44. At its outer end the slide 47 is provided with a vertical extension 47', threaded to receive a screw 49, having an eye or other device 49' at its inner extremity, in which is inserted the end of a spiral spring 50. A rod 51 receives the opposite end of said spring, and to enable the tension thereof to be regulated a wheel-nut 52 is threaded upon the screw and is normally locked against rotation by a clutch-hub 53 engaging fixed clutch-teeth of the standard 47'.

By reference to Fig. 3 it will be seen that as the sheet A of plastic material is advanced by the roll 12 and drum 38 the end of said sheet will enter the flaring mouth formed between the end 42 of the serrated plate 40 and the periphery of the drum 38 and will engage the teeth of said plate. During this action the curler-plate will be forced back by the material until its lug 45 engages the end of the slide 47, this lost motion of said plate being important at the inception of the operation to start the formation of the coil and the sheet being gradually rolled up as the material passes between the curler-plate and the drum, as illustrated in Fig. 4. Yielding pressure is applied to said curler-plate by the spring 50, said plate being gradually forced back against the tension of the same as the diameter of the coil increases, as illustrated in Fig. 4.

Designated by 54 is a flexible concave or pressure-plate which coöperates with the drum in reducing the coil to a cylinder of the desired diameter, and for adjusting this plate improved means, now to be described, have been provided.

A cross rod or bar 55 connects the side plates of the frame, and upon said rod is a sleeve 56, carrying an arm 57, the latter being provided with a lateral stud 58. Upon this stud is fitted a shoe 59, having a seat 59' to receive the stud and a comparatively broad concave upper surface $59^2$, against which an intermediate portion of the flexible concave 54 bears, as illustrated in Figs. 3 and 4. Secured to the sleeve 56 is a hand-lever 60, by which it is manipulated. At each end the flexible concave is deflected, as at 54' $54^2$.

Journaled in the side plates of the frame are rock-shafts 61 and 62, and projecting from the rock-shaft 61 is an arm 63, provided with a lateral stud 63', upon which a roller 65 may be placed, if desired, said roller bearing against the end of the concave 54 adjacent to the flexible end 54', as shown in Fig. 3. Articulated at one end to the arm 63 is a link or connecting rod 64, having an inclined groove 64' for the reception of an inclined stud $64^2$, projecting from the inner side of the lever 60. (See dotted lines, Fig. 4.) At its opposite extremity the link 64 is articulated to an arm 66, depending from and rigid with the rock-shaft 62, and from this rock-shaft projects another arm 67, carrying at its free end a roller-stud 68 in contact with the flexible concave adjacent to the end $54^2$ thereof.

Carried by one of the side plates of the frame is a plate 69, having a series of rows of perforations 70 for the reception of a pin 71.

As above stated, the concave pressure-plate 54 is flexible, and it is also resilient, so that when deflected it will tend to spring back to normal position. To regulate the size of the reducing-passage between the drum 38 and concave plate 54, the lever 60 is grasped and moved toward the right, thereby causing through the connections described said concave plate to be adjusted uniformly throughout its length by applying pressure simultaneously to its central portion and ends. After the plate has been adjusted to the required degree the pin 69 is inserted in a perforation 70 back of the lever, and therefore prevents the parts from backward movement due to the resiliency of the plate.

A hopper 72 is provided adjacent to the reducing-roller for the reception of the batches or masses of plastic material to be submitted to the action of the machine.

Secured to the side plates of the frame is a cross-strip 73, carrying an angular bracket 74, and upon the downwardly-inclined top of said bracket is a plate 75, having a flanged lower end 75'. A slot 76 in the top of the bracket and a thumb-nut 77 and bolt 78 enable the plate to be longitudinally adjusted on its support, said plate serving as a chute or inclined guideway to receive the molded cylinder from the machine.

As will be observed by reference to Fig. 3, the inner end of the plate 75 fits beneath the overhang or deflected end $54^2$ of the concave plate 54.

In the operation of my improved machine a mass or batch of plastic material—for instance, dough—is placed in the hopper 72, and said machine being set in motion it is seized and fed forward by the roller 12 and drum 38 and is thus reduced to sheet form. As the sheet advances the end thereof engages the outwardly-curved end 42 of the curler-plate 40, and said plate is forced back until the lug 43 thereof engages the end of the slide 47. This enables the coil to be started, and as it gradually increases in diameter the plate 40 holds it under pressure against the periphery of the drum 38, and said plate gradually recedes against the tension of the spring 50 as the coil or roll increases in diameter and always holds it under yielding pressure against the drum. When a coil or roll is carried beyond the curler-plate, it drops into the space between the flexible and resilient concave 54 and the periphery of the drum 38 and is gradually reduced, rolled over and over, and advanced along the concave by said drum until it assumes a cylindrical form, when it is ejected from said space over the deflected end $54^2$ of the concave and falls upon the inclined plate or table 75, down which it travels until arrested by the flange 75'. When one coil leaves the space between the curler-plate and drum, another batch is reduced to sheet form by the roll 12 and drum and the operation is repeated, and so on as long as the machine is in operation. If dough should be the plastic material operated upon, cylindrical rolls ready for the baking process are the result, and these rolls are removed from the table 75, and are each of the proper consistency, and are in the required condition to be immediately placed in the oven.

Should it be desired to narrow the space between the drum and concave, this is readily accomplished by shifting the lever 60, which through the means described will simultaneously contract all parts of said concave and will force it toward the drum. To increase said space, the lever is released by withdrawing the locking-pin 71, when the resilient concave will expand until checked by a reinsertion of the locking-pin in one of the perforations 70, thereby locking the lever 60 and the parts controlled thereby against further movement, and thus securing the concave in the desired position.

Pressure of the required degree may be applied to the curling-plate 40 by adjusting the screw 49 in the manner described, and thus altering the tension of the spring 50, and the required attenuation of the sheet of plastic material may readily be controlled by the screw 32.

While primarily designed for the formation of loaves of dough, ready for the oven, the use of the machine is restricted to no particular art, for it is capable of working various plastic materials into cylindrical rolls.

Changes may be made in many of the parts of the machine, and various means for adjusting the curler-plate may be substituted for those shown without departure from the invention. So, too, the invention is not limited to the precise means shown for driving the reducing-roll and drum, for other mechanism capable of accomplishing a like result may be substituted therefor, if desired.

Having thus described my invention, what I claim is—

1. The combination, with a reducing-roll, of a drum coöperating with said reducing-roll; a curling device coöperating with the drum; and means also coöperating with the drum to reduce a coil formed by the curling device and drum.

2. The combination, with a reducing-roll, of a drum coöperating with said reducing-roll to form a mass of plastic material into a sheet; a device also coöperating with the drum to form the sheet into a coil; and means for reducing the coil.

3. The combination, with a driving-shaft, of a gear carried thereby; a swinging frame; an idler carried by the frame, and in engagement with the gear on the driving-shaft; a shaft journaled in the swinging frame; a gear on said shaft in engagement with the idler; a roll carried by said shaft; means for adjusting the swinging frame; and a device coöperating with the roll to reduce plastic material to sheet form.

4. The combination, with a driving-shaft, of a gear carried thereby; a swinging frame; an idler carried by the frame, and in engagement with the gear on the driving-shaft; a shaft journaled in the swinging frame; a gear on said shaft in engagement with the idler; a roll carried by said shaft; means for adjusting the swinging frame; a device coöperating with the roll to reduce plastic material to sheet form; a device for curling the sheet into a coil; and means for reducing the coil.

5. The combination, with a driving-shaft, of a gear carried thereby; a swinging frame; an idler carried by the frame, and in engagement with the gear on the driving-shaft; a shaft journaled in the swinging frame; a gear on said shaft in engagement with the idler; a roll carried by said shaft; means for adjusting the swinging frame; a device coöperating with the roll to reduce plastic material to sheet form; a yielding curling-plate coöperating with said device to form the sheet into a coil; and a concave also coöperating with said device to reduce the coil.

6. The combination, with a driving-shaft, of arms sleeved on said driving-shaft; a gear on the driving-shaft; an idler carried by one of the arms, and in engagement with said gear; a shaft journaled in the arms; a gear on said shaft, and in engagement with the idler; a reducing-roll carried by the shaft; and a drum driven by the shaft and coöperating with the reducing-roll to form a mass into a sheet.

7. The combination, with a driving-shaft, of arms sleeved on said driving-shaft; a gear on the driving-shaft; an idler carried by one of the arms, and in engagement with said gear; a shaft journaled in the arms; a gear on said shaft, and in engagement with the idler; a reducing-roll carried by the shaft; a drum driven by the shaft and coöperating with the reducing-roll to form a mass into a sheet; a curler-plate coöperating with the drum to form the sheet into a coil; and a device also coöperating with the drum to reduce the coil.

8. The combination, with a driving-shaft, of arms sleeved on said driving-shaft; a gear on the driving-shaft; an idler carried by one of the arms, and in engagement with said gear; a shaft journaled in the arms; a gear on said shaft, and in engagement with the idler; a reducing-roll carried by the shaft; a drum driven by the driving-shaft and coöperating with the reducing-roll to form a mass into a sheet; a curler-plate coöperating with the drum to form the sheet into a coil; a device also coöperating with the drum to reduce the coil; and means for adjusting said device to vary the space between it and said drum.

9. The combination, with a driving-shaft, and with a reducing-roll driven by said driving-shaft, of a rotary drum; a curler coöperating with said drum; a slidable carrier upon which the curler is mounted for independent rocking movement when the sheet engages the curler; and means for holding the curler under pressure against the coil being formed from the sheet, and for permitting said curler to yield as the coil increases in diameter.

10. The combination, with a driving-shaft, and with a reducing-roll driven by said driving-shaft, of a rotary drum; a curler coöperating with said drum; a slidable carrier upon which the curler is mounted for independent rocking movement, when the sheet engages the curler; means for holding the curler under pressure against the coil being formed from the sheet, and for permitting said curler to yield as the coil increases in diameter; and a concave coöperating with the drum to reduce the coil.

11. The combination, with a driving-shaft, and with a reducing-roll driven by said driving-shaft, of a rotary drum; a curler coöperating with said drum; a slidable carrier upon which the curler is mounted for independent rocking movement, when the sheet engages the curler; means for holding the curler under pressure against the coil being formed from the sheet, and for permitting said curler to yield as the coil increases in diameter; a concave coöperating with the drum to reduce the coil; and means for adjusting the concave to control the size of the passage between it and the drum.

12. The combination, with a swinging frame, and with means for adjusting said frame, of gearing carried by the frame; means for actuating said gearing; a roll driven by an element of said gearing; and a rotary drum coöperating with the roll to reduce a mass of plastic material to sheet form.

13. The combination, with a swinging frame, and with means for adjusting said frame, of gearing carried by the frame; means for actuating said gearing; a roll driven by an element of said gearing; a rotary drum coöperating with the roll to reduce a mass of plastic material to sheet form; a device for forming the sheet into a coil; and means coöperating with the drum to reduce the coil to a roll.

14. The combination, with a shaft, of a frame mounted for swinging movement; a gear on the shaft; a rotary drum driven by the gear on the shaft; a roller driven by gearing actuated by the gear on the shaft; and means for adjusting the swinging frame to locate the roller at the desired distance from the drum.

15. The combination, with a shaft, of a frame mounted for swinging movement; a gear on the shaft; a rotary drum driven by the gear on the shaft; a roller driven by gearing actuated by the gear on the shaft; means for adjusting the swinging frame to locate the roller at the desired distance from the drum; and a device coöperating with the drum and roller to form the sheet into a coil.

16. The combination, with a shaft, of a frame mounted for swinging movement; a gear on the shaft; a rotary drum driven by the gear on the shaft; a roller driven by gearing actuated by the gear on the shaft; means for adjusting the swinging frame to locate the roller at the desired distance from the drum; a device coöperating with the drum and roller to form the sheet into a coil; and a concave coöperating with the roller to reduce the coil.

17. The combination, with a shaft, of a frame mounted for swinging movement; a gear on the shaft; a rotary drum driven by the gear on the shaft; a roller driven by gearing actuated by the gear on the shaft; means for adjusting the swinging frame to locate the roller at the desired distance from the drum; a device coöperating with the drum and roller to form the sheet into a coil; a concave coöperating with the roller to reduce the coil; and means for adjusting said concave to regulate the size of the passage between the concave and drum.

18. The combination, with means for reducing a mass to the form of a sheet, of a yielding curler-plate coöperating with an element of said means to form the sheet into a coil; and means whereby said plate may be forced back by the sheet before it commences its yielding movement to accommodate the increasing diameter of said coil.

19. The combination, with a reducing-roller, of a rotary drum; a yielding slide; and a curler-plate pivoted to the slide, and coöperating with the drum to form the sheet into a coil.

20. The combination, with a reducing-roller, of a rotary drum; a yielding slide, and a curler-plate carried by the slide, and coöperating with the drum to form the sheet into a coil; and means for permitting an independent movement of said curler-plate before the slide commences its retreat.

21. The combination, with means including a rotary drum for reducing a mass to the form of a sheet, of a curved curler-plate coöperating with the drum to coil the sheet; a slide carrying said curler-plate; and means for forcing said slide toward the drum, and for permitting it to yield as the coil increases in diameter.

22. The combination, with means including a rotary drum for reducing a mass to the form of a sheet, of a curved curler-plate coöperating with the drum to coil the sheet; a slide carrying said curler-plate; means for forcing said slide toward the drum, and for permitting it to yield as the coil increases in diameter; and a flexible concave coöperating with the drum to reduce the coil.

23. The combination, with means including a rotary drum for reducing a mass to the form of a sheet, of a curved curler-plate coöperating with the drum to coil the sheet; a slide carrying said curler-plate; means for forcing said slide toward the drum, and for permitting it to yield as the coil increases in diameter; a flexible concave coöperating with the drum to reduce the coil; and means for adjusting said concave to regulate the size of the passage between it and the drum.

24. The combination, with a concave, of a shoe for supporting an intermediate part thereof; rock-shafts having arms bearing against other parts of said concave; a link between the rock-shafts, and having an inclined groove; and a lever having a stud fitted in said inclined groove, said lever being connected to the shoe.

25. The combination, with a concave, of a shoe for supporting an intermediate part thereof; rock-shafts having arms bearing against other parts of said concave; a link between the rock-shafts, and having an inclined groove; a lever having a stud fitted in said inclined groove, said lever being connected to the shoe; a plate having perforations; and a device for locking said lever adapted to be inserted in any of said perforations.

26. The combination, with a rotary drum, and with means coöperating therewith for advancing a sheet, of a curved curler-plate having serrations; a slide to which said curler-plate is pivoted for independent rocking movement; and a spring for forcing the slide toward the drum, and permitting it to yield as the coil increases in diameter.

27. The combination, with a rotary drum, and with means coöperating therewith for advancing a sheet, of a curved curler-plate having serrations; a slide to which said curler-plate is pivoted for independent rocking movement; a spring for forcing the slide toward the drum, and permitting it to yield as the coil increases in diameter; and means for regulating the tension of the spring.

28. The combination, with a rotary drum, and with means coöperating therewith for advancing the sheet, of a curved curler-plate having serrations; a slide to which said curler-plate is pivoted for independent rocking movement; a spring for forcing the slide toward the drum; and a screw for regulating the tension of the spring.

29. The combination, with a hopper for containing plastic material, of a roller; a drum coöperating with said roller to reduce a mass to sheet form; a yielding curler-plate coacting with the drum to form the sheet into a coil; and a concave also coöperating with said drum to reduce the coil to a cylinder.

30. The combination, with a hopper for containing plastic material, of a roller; a drum coöperating with said roller to reduce a mass to sheet form; a yielding curler-plate coacting with the drum to form the sheet into a coil; a concave also coöperating with said drum to reduce the coil to a cylinder; and means for adjusting the concave to regulate the size of the passage between it and said drum.

31. The combination, with a swinging frame, of a sprinkling device carried by the frame; a roller journaled in said frame; gearing carried by the frame for driving the roller; means for adjusting the frame; an agitator in the frame; means for actuating the agitator; a rotary drum coöperating with the roller; and a curling device for causing the sheet formed by the roller and drum to assume a coiled form.

32. A machine for molding plastic material comprising the following elements in combination, a rotary drum; a roller coöperating with the drum to reduce the material to a sheet; a swinging frame carrying said roller; means carried by the frame for rotating said roller; means for adjusting the swinging frame to raise and lower the roller without disarrangement of the means for rotating said roller; a device coöperating with the drum to form the sheet into a coil; and a device also coöperating with said drum to roll and reduce the coil.

33. The combination, with means, including a rotary drum, for advancing a sheet of plastic material, of a concave curler-plate serrated on the inner side; means for supporting said curler-plate for independent rocking movement; a carrier for said means; and means for permitting a yielding movement of said carrier as the coil increases in diameter.

34. The combination, with means, including a rotary drum, for advancing a sheet of plastic material, of a concave curler-plate serrated on its inner side; means for supporting said curler-plate for independent rocking movement; a carrier for said means; means for permitting a yielding movement of said carrier as the coil increases in diameter; and a concave coöperating with the drum to reduce the coil after it leaves the curler-plate.

35. The combination, with means, including a rotary drum, for advancing a sheet of plastic material, of a concave curler-plate serrated on its inner side; means for supporting said curler-plate for independent rocking movement; a carrier for said means; means for permitting a yielding movement of said carrier as the coil increases in diameter; a concave coöperating with the drum to reduce the coil after it leaves the curler-plate; and means for simultaneously adjusting different parts of said concave, to vary the space between the concave and drum.

36. The combination, with a rotary drum, and with means coöperating therewith for advancing a sheet, of a serrated curler-plate; a device to which said curler-plate is connected for independent movement when it is first engaged by the sheet; and means for forcing said device forward, and for permitting its retreat under yielding pressure as the coil formed by the curler-plate and drum increases in diameter.

37. The combination, with a swinging frame, and with means for adjusting said frame, of a roller journaled in the frame; gearing carried by the frame for rotating said roller; a rotary drum; a sprinkling device carried by the frame; an agitator in the hopper of the sprinkling device; and means operated by the shaft of the roller for actuating said agitator.

In testimony whereof I affix my signature in presence of two witnesses.

CHARLES ALLEN THOMSON.

Witnesses:
V. PENNINGTON, Jr.,
J. M. BRADLEY.